J. E. Emerson,
Tool Handle,
No. 1,304. Reissued Apr. 29, 1862
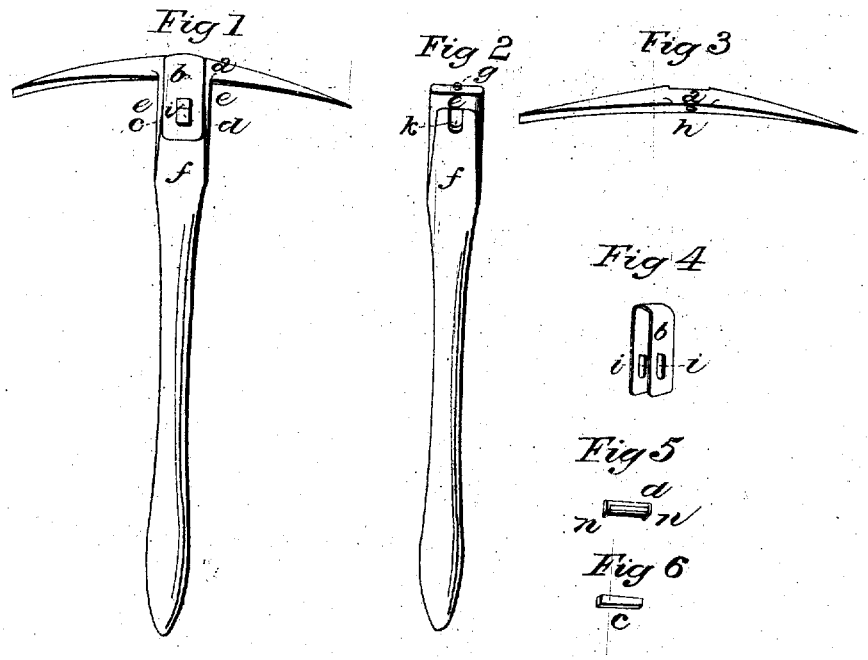
Witnesses:
W. W. Morshall
Chas. Hymes
Inventor.
James E. Emerson

UNITED STATES PATENT OFFICE.

JAMES E. EMERSON, OF TRENTON, NEW JERSEY.

MODE OF FASTENING TOOLS TO THEIR HANDLES.

Specification forming part of Letters Patent No. 23,358, dated March 29, 1859; Reissued April 29, 1862, No. 1,304.

*To all whom it may concern:*

Be it known that I, JAMES E. EMERSON, late of Sacramento, State of California, but now of the city of Trenton and State of New Jersey, have invented a new and Improved Mode of Fastening Handles to Picks and other Tools or Instruments Without Eyes; and I do declare that the following is a full, clear, and exact description of the construction and operation of the same, reference being had to the annexed drawings, making a part of this specification, in which—

Figure 1 is a perspective view; Figs. 2, 3, 4, 5 and 6 are transverse sections as follows:

Fig. 1 represents a "solid pick" made of cast steel and fastened to a wooden handle having an iron heading with a level face and a pin on the end and securely fastened to the handle by means of straps extending from the heading down the sides of the handle, and with an "iron stirrup" extending around the outside of the "pick" on the sides of the handle, the heading being fastened to the handle by rivets or screws and the pick or other instrument, being firmly secured by means of the "transverse key and wedge."

Fig. 2 represents a handle made of wood in any of the usual forms, with a heading on the end of solid iron and having a level surface with a projecting pin on the center represented in said figure by letter "*g*" and straps extending on the sides of the wood represented in said figure by letters "*e*, *e*" by means of which the heading is fastened to the wood "*f*" with rivets or screws.

I do not wish to confine myself to the precise form of heading here represented and described. The heading can be made in various forms and shapes to suit the requirements of particular cases. For instance, it need not of necessity be made in one piece or with a solid plate over the end of the wood handle, but may be made in two pieces (and confined to the handle as described) with sides sufficiently strong to enable the maker to confine the pick or other instrument to the handle perfectly secure by means of the transverse key as described.

Fig. 3 represents a solid cast steel pick in which letter "*h*" is a punched or drilled hole to admit the pin *g* of Fig. 2 whereby the pick (having shoulders on the back) is prevented from moving backward or forward. The key and wedge letter "*d*" Fig. 5 and letter "*c*" Fig. 6 being transverse to the "pick" or other instrument, can not be jarred out during the use of the pick or other instrument.

Fig. 4 represents an iron stirrup made to cover and surround the outside of the pick, and extend over the heading described in Fig. 2 and along the sides or edge of the handle, being fastened thereto by means of a transverse key, represented in Fig. 5 letter "*d*" with flanges "*n*, *n*," the wedge represented in Fig. 6 letter "*c*" extending through the aperture in the stirrup represented in Fig. 4 by letters "*i*, *i*," and the aperture in the handle represented in Fig. 2 by letter "*k*." I do not confine myself to this precise construction of stirrup or combination of "heading and stirrup." They may be so constructed as to be of one piece having the "socket" or "opening" to receive the pick or other instrument properly constructed and the seat being provided for and the opening or slot for the "transverse wedge" "*c*," &c., being in correct position relatively with said seat. The pick or other instrument may have (on the face coming next to the handle) a key seat cut (transversely to the pick or other instrument) to receive a part of the transverse "wedge" "*c*" thereby firmly securing the pick or other instrument to the heading of the handle without the use of a separate stirrup.

The nature of my invention consists in providing the end of a handle with a combined fastening complete in itself, which will secure a pick or other instrument thereon, without an eye in the instrument, and prevent the handle becoming loose by the shrinkage of the wood and also prevent the weakening of the instrument by having an eye to contain the handle.

I construct the pick or other instrument in any of the usual forms, but, without an eye for the handle and instead thereof with shoulders on the back and a small hole or a swelling (or other mechanical device) on the under side as represented in Fig. 3 at the letters "*a*," "*h*" so as to correspond with a pin or hollow or other mechanical device on the end of the handle or heading as represented in Fig. 2 by a letter "*g*." I also construct the handle of the usual form and of convenient size to suit the instrument, and on the end thereof, securely fasten with screws or rivets an iron heading, with a solid front or face having a pin on the center or a hollow or other mechanical device corresponding in shape with the hole, swelling or other device on the underside of the pick or other instrument, as represented in Fig. 3 letter "*h*", which heading as represented in Fig. 2 letter "*g*" being fitted exactly to the underside of the pick or other instrument, as represented in Fig. 3 letter "*h*" and securely fastened thereto by means of the stirrup as represented in Fig. 4 letter "*b*" with the transverse key represented in Fig. 5 letters "*d*" "*n*, *n*" and the transverse wedge represented in Fig. 6 letter "*c*" passing through the aperture in the stirrup letter "*i i*" Fig. 4 and the aperture in the handle as represented in Fig. 2 letter "*k*" fastens the handle on the pick or other instrument as represented in Fig. 1 letters *a*, *b*, *c*, *d*, *e*, *f*.

The form and construction of each and all the above described parts can and may be varied from the foregoing description according to circumstances as previously explained, consequently I do not confine myself to this precise construction and application of the various parts.

What I claim as my invention and desire to secure by Letters Patent is:

1. I claim the use of picks, axes, or other analogous tools without eyes therein, when the same are fastened to a handle by means of a stirrup an iron heading a gib and key or wedges.

2. I claim the iron heading of a handle in combination with the transverse key or wedge and the eyeless pick, ax, or other analogous tool.

3. I claim the key or wedge when the same is used transversely to the tool for attaching picks, axes or other analogous tools to handles.

Trenton, New Jersey, Decr. 21st, 1861.

JAMES E. EMERSON.

Witnesses:
FREDERICK KINGMAN,
EDMUND CRAFT.

[FIRST PRINTED 1911.]